(12) United States Patent
Vermilyea et al.

(10) Patent No.: US 9,868,259 B2
(45) Date of Patent: Jan. 16, 2018

(54) FIBER PLACEMENT MACHINE ROLLER WITH VACUUM ASSISTED TOW HANDLING

(71) Applicant: General Electric Company, Schentectady, NY (US)

(72) Inventors: Mark Ernest Vermilyea, Niskayuna, NY (US); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 188 days.

(21) Appl. No.: 14/857,858

(22) Filed: Sep. 18, 2015

(65) Prior Publication Data
US 2017/0080646 A1    Mar. 23, 2017

(51) Int. Cl.
*B29C 70/38*    (2006.01)
*B29C 70/54*    (2006.01)

(52) U.S. Cl.
CPC .......... *B29C 70/382* (2013.01); *B29C 70/386* (2013.01); *B29C 70/54* (2013.01)

(58) Field of Classification Search
CPC ...... B29C 70/382; B29C 70/386; B29C 70/54
See application file for complete search history.

(56) References Cited

U.S. PATENT DOCUMENTS

| | | | |
|---|---|---|---|
| 6,318,060 B1 * | 11/2001 | Dinkelmann | D01H 1/025 19/244 |
| 6,390,169 B1 | 5/2002 | Johnson | |
| 7,810,539 B2 | 10/2010 | Mischler et al. | |
| 8,308,101 B2 | 11/2012 | McCowin | |
| 8,826,957 B2 | 9/2014 | Shair et al. | |
| 2007/0044922 A1 | 3/2007 | Mischler et al. | |
| 2008/0000576 A1 | 1/2008 | Miller et al. | |
| 2011/0011537 A1 | 1/2011 | Hamlyn et al. | |
| 2011/0011538 A1 | 1/2011 | Hamlyn et al. | |
| 2011/0155849 A1 | 6/2011 | Van Nieuwenhove et al. | |
| 2012/0073726 A1 | 3/2012 | Koeniger et al. | |

* cited by examiner

*Primary Examiner* — Vishal I Patel
(74) *Attorney, Agent, or Firm* — General Electric Company; William Scott Andes

(57) ABSTRACT

A fiber placement system is provided that can include a compaction roller defining a plurality of openings between a roller outer surface and a roller inner surface. The plurality of openings are in fluid communication with a vacuum source. A cover can be included in or on the compaction roller so as to block airflow through a portion of the openings. The fiber placement system can also include a head including a frame and at least one supply spool mounted on the frame. The supply spool is supported on a hub for rotation, and the compaction roller is aligned to receive one or more fiber tows from the at least one supply spool. Methods are also provided for laying a prepreg tow material using automated fiber placement.

9 Claims, 4 Drawing Sheets

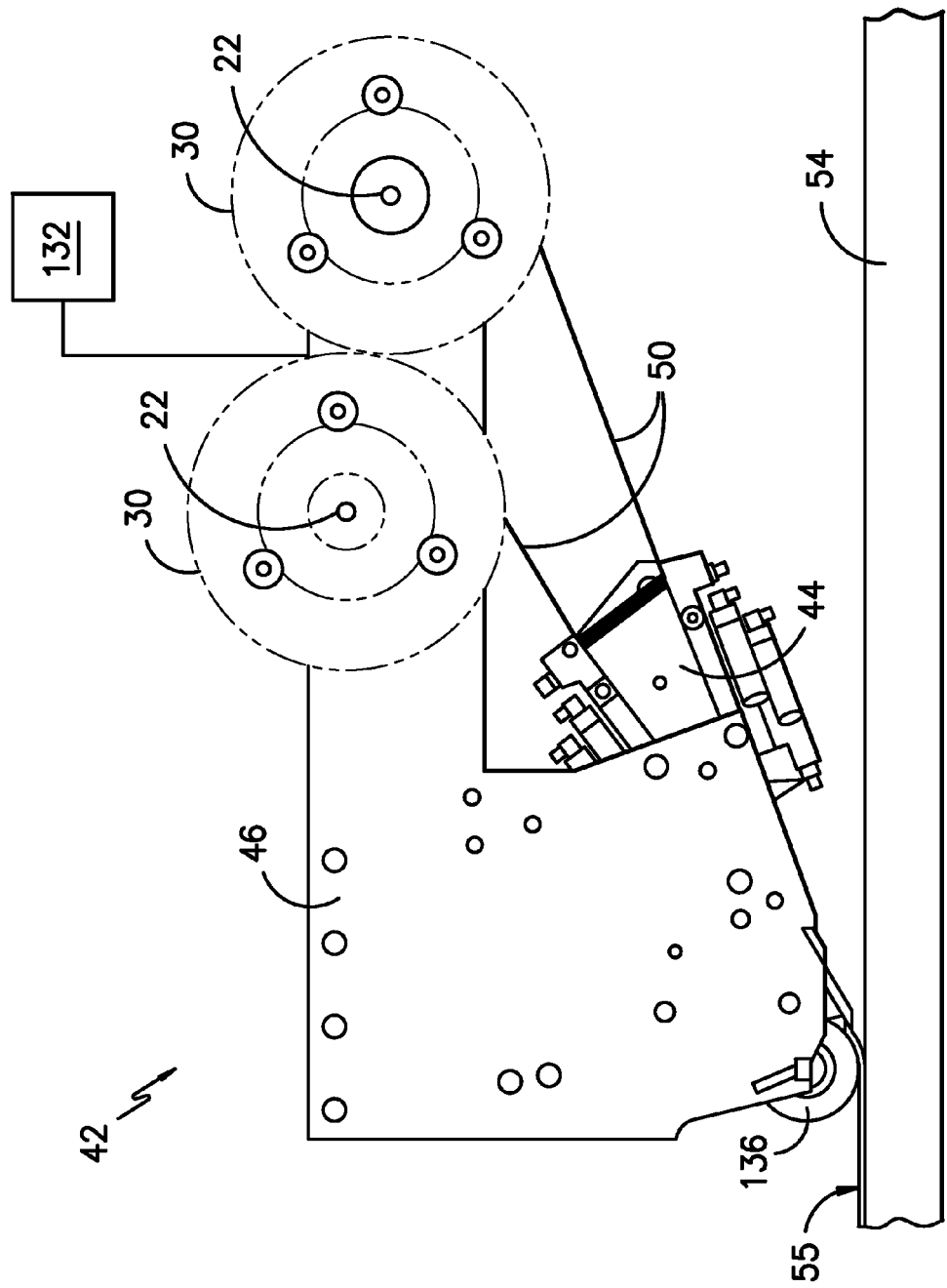
FIG. -1-

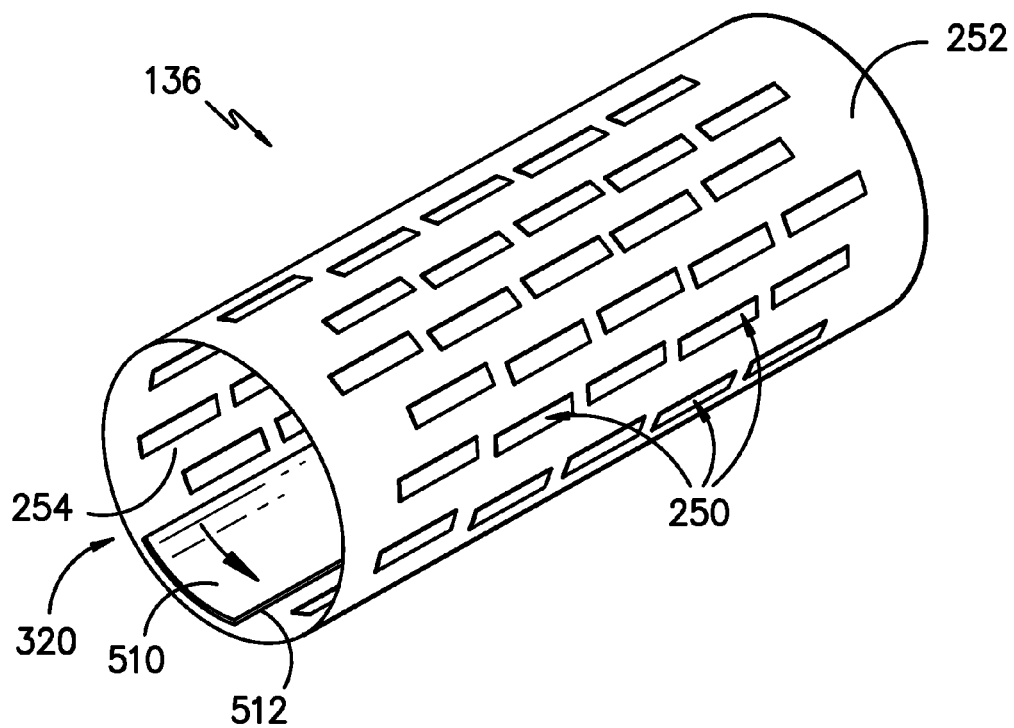
FIG. -2-
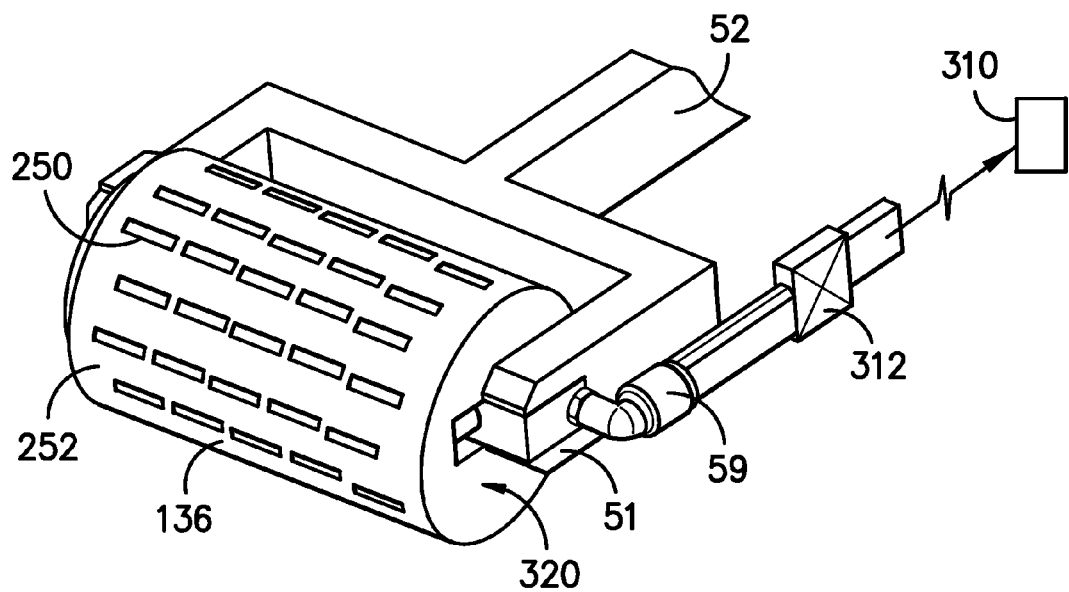
FIG. -3-

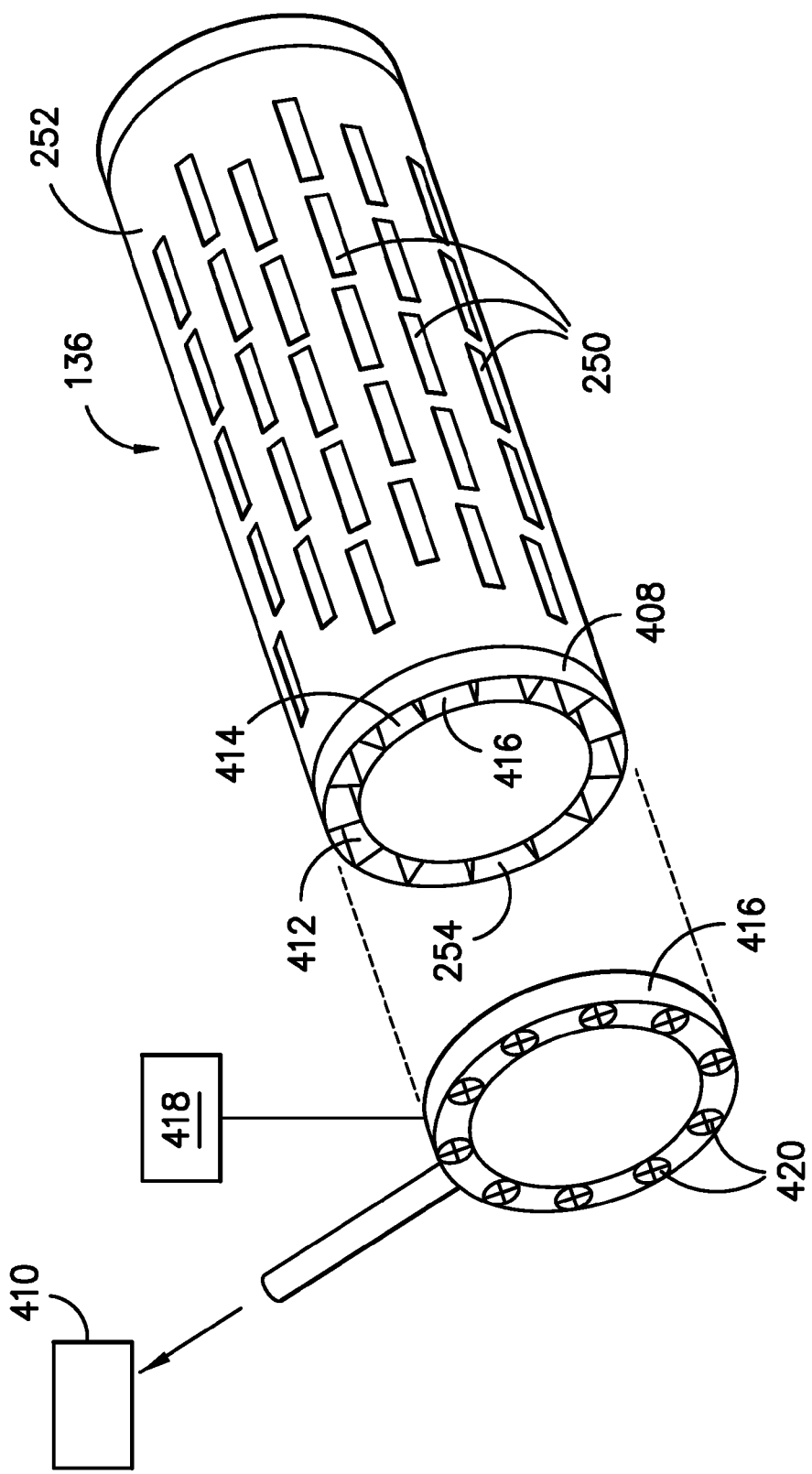
FIG. -4-

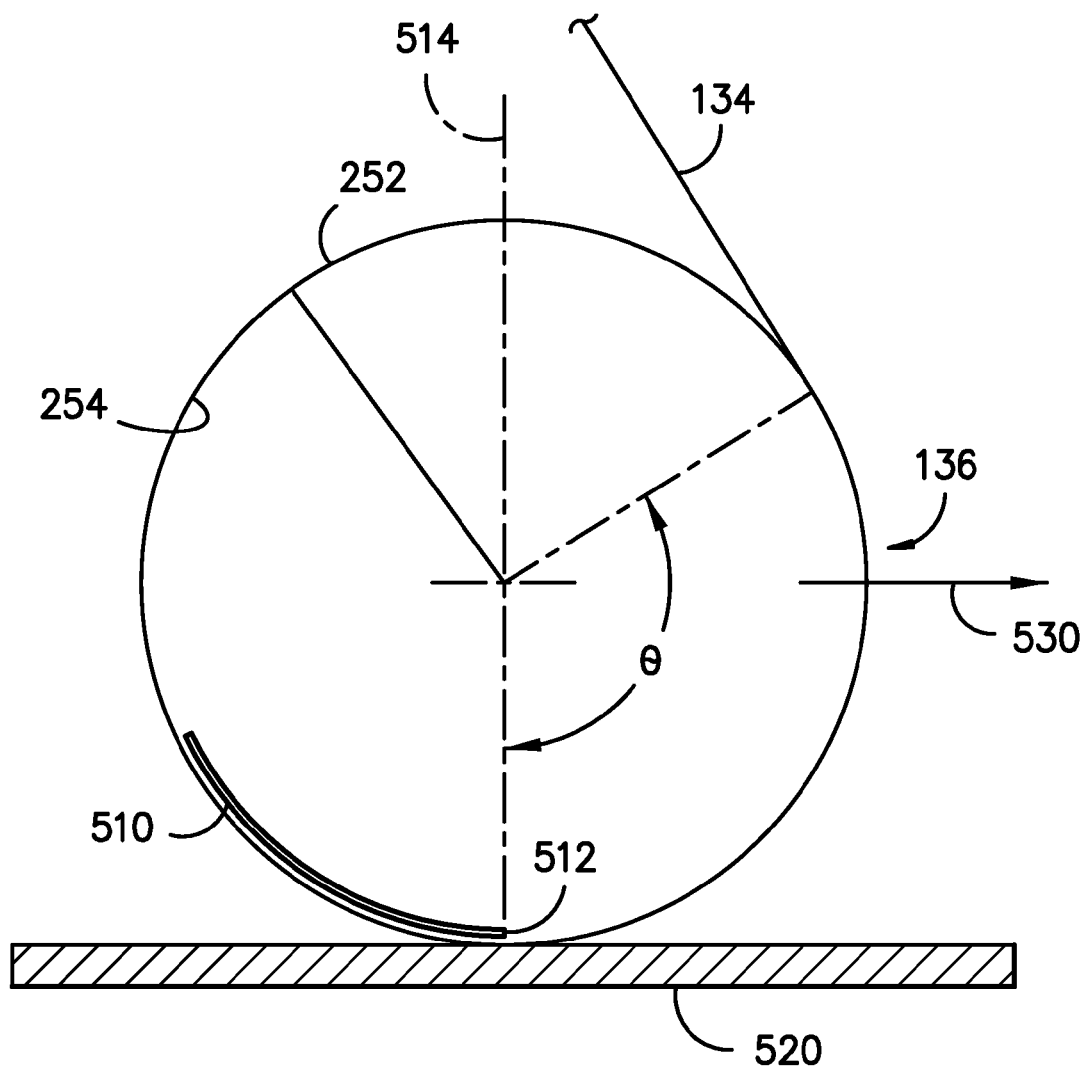
FIG. -5-

FIBER PLACEMENT MACHINE ROLLER WITH VACUUM ASSISTED TOW HANDLING

FIELD OF THE INVENTION

The present subject matter relates generally to systems performing automated fiber placement (AFP) processes in composite material fabrication. More particularly, automated systems for controllably delivering, retaining, and applying fiber tows during fabrication using a vacuum assisted compaction roller are disclosed.

BACKGROUND OF THE INVENTION

Resin infused fiber composite materials are being used increasingly in a variety of diverse industries, such as automotive, aircraft, and wind-energy, in part, because of their low weight and high strength properties. Adapting to changes in AFP equipment designs, tape and tow thickness requirements, new resin types, variations in impregnation levels, spread tows, out-of-autoclave (OOA) technologies and the application of thermoplastics requires new devices and methods for handling materials. New processing methods might employ in situ heating/consolidation of the precision-slit tape at the spool head/tooling calling for improved equipment.

Composite material machine manufacturers have been working to reduce the minimum tow length by reducing the size of the parts in the head. With the roller diameters all converging to about 2 inches, and the cutter locations as close as they can be, the minimum tow length is about 4 inches for all but specialty machines. Fiber placement machine capability is limited by minimum tow length, i.e. the distance from the cutters to where the roller meets the tool (usually about 4 inches). Additionally, incorrect starting paths for tows have not been corrected and tows are sometimes not laid accurately at the start of a course as they are pushed out of the head around the roller while the roller is moved onto the tool. The machines depend on the tows maintaining their shape and location in space as they are pushed out of the head past a curved guide before reaching the roller. Depending on many factors including tow width and stiffness, temperature and resulting resin viscosity, and trajectory and speed of the head motion, the tows can start off-course. In this case, they may become wrinkled as the head follows the intended path and the tows are forced to follow from a non-aligned starting path thereby affecting quality and length of the fiber tows.

A typical prepreg AFP system uses material that comprises a bed of fibers that have been pre-impregnated with uncured resin then slit to tape of the required width. The material is spooled as it is slit, then the spools are stored in freezers until ready for use to avoid advancing the cure state of the resin. Prepregs, comprising a fiber arrangement impregnated with curable thermosetting resin are widely used in the preparation of composite materials that allow careful control of the fiber and resin quantities and provide flexibility in the shapes they can adopt. However, these systems do not permit control of the fiber placement head roller, also referred to as the compaction roller, to provide more accurate placement of individual tows.

It would therefore be desirable to provide an improved system that permits control of tows as they pass around the compaction roller. In addition, it would be desirable for the system to facilitate adjustable and selectable vacuum assistance to the compaction roller to hold the one or more fiber tows against the roller during layup of the infused fiber tows for formation of complex composite components. The desired results create an AFP system that is more functional, is applied to a wider range of part geometries, leads to higher quality, and allows for short length fiber placement.

BRIEF DESCRIPTION OF THE INVENTION

Aspects and advantages of the invention will be set forth in part in the following description, or may be obvious from the description, or may be learned through practice of the invention.

A fiber placement system is generally provided. In one embodiment, the fiber placement system includes a compaction roller defining a plurality of openings between a roller outer surface and a roller inner surface. The plurality of openings are in fluid communication with a vacuum source. In particular embodiments, a cover can be included in or on the compaction roller so as to block airflow through a portion of the openings. For example, the cover can be a sleeve.

The fiber placement system of claim 1 can, in particular embodiments, also include a head including a frame and at least one supply spool mounted on the frame. The supply spool is supported on a hub for rotation; and the compaction roller is aligned to receive one or more fiber tows from the at least one supply spool.

Methods are also generally provided for laying a prepreg tow material using automated fiber placement. In one embodiment, the method includes directing a plurality of resin infused fiber tows from a supply spool onto a compaction roller, with the compaction roller defines a plurality of openings between a roller outer surface and a roller inner surface; forming a suction pressure through at least a portion of the plurality of openings to hold the fiber tows adjacent to the compaction roller; and contacting the compaction roller with a matrix material to form a prepreg tape.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an illustration of a side view of a fiber placement head employing standard size spools of fibers and a fiber tensioning device;

FIG. 2 is a perspective of a vacuum assisted compaction roller having a sliding inner sleeve for blocking a portion of the vacuum openings;

FIG. 3 is a perspective of a vacuum assisted compaction roller tool with a controllable vacuum connection at the axle;

FIG. 4 is perspective of a vacuum assisted compaction roller with a vacuum manifold controlled by a rotary actuator; and FIG. 5 is a diagram of a vacuum assisted compaction roller, with a sliding inner sleeve, laying a tow on a cutting tool surface.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms.

A compaction roller is generally provided that maintains contact between the fiber placement head and the tool. The roller can be improved by adding openings that are connected to a vacuum source. This configuration can provide the capability to hold the tows against the roller and limit the amount of tow motion that happens during start and finish of a course, particularly for short tows. The vacuum source can be turned on and off as needed depending on the layup sequence.

The compaction roller can be made hollow, with slits, slots, holes, cutouts or other profiled openings through its radial thickness and a connection to a vacuum source from its axle or a manifold. The ends can be sealed with rotating seals sufficient to limit the amount of air that will enter through the ends when the vacuum is applied. As tows pass around the compaction roller on their path to the tool where they are to be laid, the vacuum can be applied to create a differential air pressure from one face of the tow to the other, so as to hold the tows against the roller and limit transverse motion that could otherwise skew the tow from its intended path and cause problems in the layup. The vacuum also limits the tendency for tows to become stuck in the head. The roller can be configured so that the openings only experience the vacuum on the partial arc over which the tows pass, so that the air volume handled by the suction system is reduced. The attractive force to the roller can be removed as needed, such as when courses are started or ended, by turning off the vacuum source.

FIG. 1 illustrates an exemplary AFP head 42 and supply spools 30 that serve a vacuum assisted compaction roller 136. The head 42 may include a frame 46 on which there is mounted one or more supply spools 30 of fibers 50. As used herein, "fiber" and "fibers" refers to resin infused composite fibers that may be in the form of composite fiber tape that may be cut into narrow strips which are sometimes referred to as tows, as well as to fiber rovings. Although two supply spools 30 are shown in the drawings, more or less than two spools may be present on the head 42. Each of the supply spools 30 is removably supported on a hub 22 for rotation therewith, and feeds resin infused fibers 50 to one or more fiber alignment and re-thread mechanisms 44. The mechanisms guide the resin infused fibers 50 into aligned, side-by-side relationship to form a bandwidth 55 which may be cut by a mechanism 44 and compacted onto a substrate 54 by a vacuum assisted compaction roller 136. The specific configuration of the fiber placement head 42 may vary based on the application. The resin infused fiber tows 50 can include at least one material of glass, carbon, basalt, polymeric, silica, copper, or mixtures thereof.

The composite fiber placement head 42 further includes a controller circuit 132 to control the delivery and placement of the fiber tows 50. In one embodiment, the controller circuit 132 may comprise a computer or other suitable processing unit. Thus, in several embodiments, the controller circuit 132 may include suitable computer-readable instructions that, when implemented, configure the controller circuit 132 to perform various different functions, such as receiving, transmitting and/or executing control signals.

A computer generally includes a processor(s) and a memory. The processor(s) can be any known processing device. Memory can include any suitable computer-readable medium or media, including, but not limited to, RAM, ROM, hard drives, flash drives, or other memory devices. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory can also include data that may be retrieved, manipulated, or stored by processor(s). For instance, after receiving the temperature or speed measured from the AFP head 42, memory can store the information. Additionally, memory can store parameters for various other sources.

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the AFP head 42.

FIG. 2 shows a vacuum assisted compaction roller 136 defining a plurality of openings 250 therein so as to provide differential fluid pressure between the outer surface 252 and the inner surface 254 of the compaction roller 136. The plurality of openings 250 can have any suitable profile, such as slots, slits, holes, cutouts, or mixtures thereof. The plurality of openings 250 can be arranged in any suitable fashion such as continuous in a spiral path, in concentric circle paths, individual, or mixtures thereof. The plurality of openings 250 define a 'free area' portion of the compaction roller outer surface 252 area where a fluid, such as air or vacuum, passes. The free area is in the range of approximately 10% to 60% of the compaction roller outer surface 252 area.

As shown in FIGS. 2 and 5, the vacuum assisted compaction roller 136 can include a cover configured to block airflow through a portion of the openings 250, shown in this embodiment as sleeve 510. In one embodiment, sleeve 510 is positioned adjacent to the inner surface 254 of the vacuum assisted compaction roller 136. However, the sleeve 510 can be positioned on the outer surface in other embodiments. The sleeve 510 slidably blocks a selected portion of the plurality of openings 250. The sleeve 510 can be sized to block a portion of the free area in the range of approximately 10% to 90% (e.g., about 10% to about 25%). The sleeve 510 can be positioned to maintain the leading edge 512 at or near the roller contact line 514 and aft of laydown thereby inhibiting the laid tow 50 from being pulled up by the vacuum. The sleeve 510 can slide in edge channels (not shown) disposed around the perimeter adjacent both ends of the compaction roller 136. The sleeve 510 can be held in a preselected position by locking arms (not shown) attached to the sleeve 510 and the frame 51 (FIG. 3) to maintain the sleeve 510 in a preselected fixed position while the compaction roller 136 rotates.

FIG. 3 shows another embodiment as a vacuum assisted compacting tool which includes a frame 51, a central shaft 52, and one or more connections 59 to a source of vacuum 310. As the user deposits tape or tows onto a tool, compaction tool 136 is used to consolidate layers, to squeeze out voids, and to make the best bonds possible between layers or tows of material. The vacuum source 310 can be activated and pressure controlled with a valve 312. When the valve 312 opens, a vacuum is drawn on the roller inner chamber 320 of the compaction roller 136 activating the plurality of openings 250 to constrain movement of the fiber tows 50 while in contact with the outer surface 252 of the compaction roller 136.

FIG. 4 shows the vacuum assisted compaction roller 136 with a vacuum manifold 408 that provides fluid communication between the plurality of openings 250 and the manifold vacuum source 410, for example provided by a vacuum pump. The vacuum manifold 408 can include at least one partition 412 positioned to separate the manifold 408 into at least one manifold chamber 414. As shown, each manifold chamber 414 is defined between the compaction roller 136 inner wall 254, the manifold inner radial wall 416 and adjacent partitions 412. The manifold chambers 414 provide fluid communication with a selected portion of the plurality of openings 250. At least one rotary actuator 416 is in fluid communication with the manifold chambers 414 and the manifold vacuum source 410. The rotary actuator 416 selectively activates valves or ports 420 that serve manifold chambers 414 such that selected portions of the plurality of openings 250 are active at any one time. A controller circuit 418 selectively activates the valves or ports 420 of the rotary actuator 416 to enable fluid communication between the manifold vacuum source 410 and the manifold chambers 414.

FIG. 5 is a schematic of the vacuum assisted compaction roller 136 with a resin-infused tow 134 in contact with the outer surface 252 of the compaction roller 136 over the perimeter distance corresponding to the contact angle θ. In certain embodiments, the contact angle θ is in the range of about 20 degrees to about 80_degrees. The compaction roller 136 travels in the roller direction 530 while laying the resin-infused tow 134 onto the tool surface 520 for cutting. The vacuum draw through the plurality of openings 250 keeps the resin-infused fiber row 134 aligned taut against the outer surface 252 thereby avoiding additional fiber length incurred from misalignment or movement of the fiber tow 134 prior to cutting at the nip point.

The vacuum assisted compaction roller 136 'grips' the tow 134 as it is laid so that it does not move from the feed position. Without the vacuum grip, the length of material from the cutter to the nip point (line contact 514 of vacuum assisted compaction roller on tool) is constrained only at the nip point and it can move around more easily thereby extending the tow length. Additionally, the compaction roller 136 often does not compact uniformly across the width of the roller because of the tool geometry. The vacuum assisted compaction roller 136 provides additional constraint on all tows 134 across the width thereby providing more uniform fiber laydown.

Vacuum sources in the range of 3 psig to 6 psig is generally sufficient to retain the tow position. Variations of forces on the tow and surface friction of the roller affect the vacuum requirements. Some rollers have anti-stick and low friction covers or coatings; some are simply rubber compounds and provide higher surface friction.

The vacuum assisted compaction roller, such as shown in FIGS. 1-5, can be utilized in a method of laying a prepreg tow material. In one embodiment, the method includes directing a plurality of fiber tows from a supply spool onto a compaction roller, wherein the compaction roller defines a plurality of openings between a roller outer surface and a roller inner surface; forming a suction pressure through at least a portion of the plurality of openings to hold the fiber tows adjacent to the compaction roller; and contacting the compaction roller with a matrix material to form a prepreg tape. Additional method steps may include; constant suction during layup; valve open—no suction to head; valve closed during short toe application; open valve after laydown. The placement systems and methods of the vacuum assisted compaction roller improvements herein can be applied to any tow material including conventional prepreg tows.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber placement system comprising:
   a compaction roller defining a plurality of openings between a roller outer surface and a roller inner surface, wherein the plurality of openings are in fluid communication with a vacuum source, wherein the compaction roller comprises a vacuum manifold in fluid communication with the plurality of openings and the vacuum source,
   wherein the vacuum manifold comprises a plurality of partitions disposed between the roller inner surface and a manifold inner wall to define a plurality of manifold chambers between the roller inner surface and the manifold inner wall, and
   wherein each manifold chamber is in fluid communication with a corresponding portion of the plurality of openings.

2. The fiber placement system of claim 1, wherein the plurality of openings define slots, slits, holes, cutouts, or mixtures thereof.

3. The fiber placement system of claim 1, wherein the compaction roller comprises a cover configured to block airflow through a portion of the openings.

4. The fiber placement system of claim 1, wherein the compaction roller comprises a sleeve positioned to block airflow through a portion of the openings.

5. The fiber placement system of claim 1, wherein the compaction roller comprises a sleeve disposed adjacent to the roller inner surface.

6. The fiber placement system of claim 1, wherein the vacuum source is in fluid communication with a roller inner chamber of the compaction roller.

7. The fiber placement system of claim 1, further comprising:
   at least one rotary actuator in fluid communication with the plurality of manifold chambers and the vacuum source.

8. The fiber placement system of claim 7, further comprising:
   a controller circuit for selectively activating portions of the at least one rotary actuator.

9. The fiber placement system of claim 1, further comprising:
   a head including a frame;
   at least one supply spool mounted on the frame, wherein the supply spool is supported on a hub for rotation; and the compaction roller aligned to receive one or more fiber tows from the at least one supply spool.

* * * * *